(No Model.)
J. V. BRANDAU.
REMEDY FOR EXCESSIVE PERSPIRATION.
No. 351,621.   Patented Oct. 26, 1886.
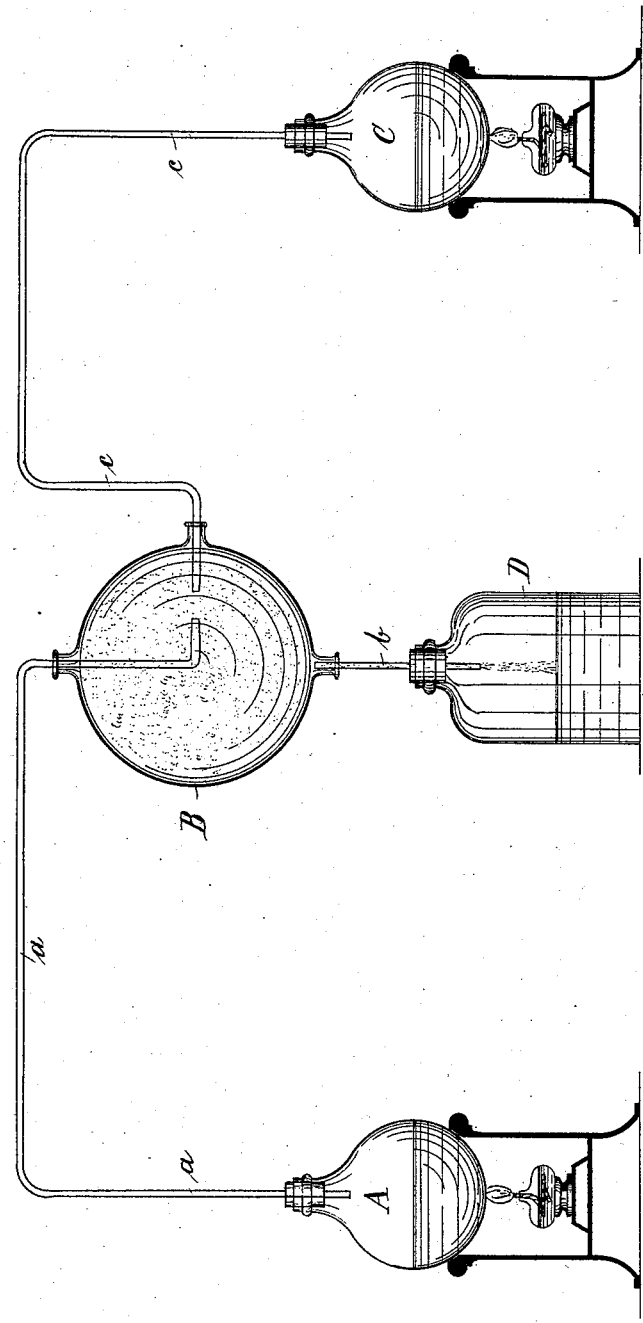
Witnesses.
H. R. McCready
Robert Everett
Inventor,
Julius V. Brandau,
By James L. Norris.
Atty.

UNITED STATES PATENT OFFICE.

JULIUS VALENTIN BRANDAU, OF LICHTENAU, HESSE-NASSAU, PRUSSIA, GERMANY.

REMEDY FOR EXCESSIVE PERSPIRATION.

SPECIFICATION forming part of Letters Patent No. 351,621, dated October 26, 1886.

Application filed April 14, 1886. Serial No. 198,854. (No specimens.) Patented in England March 19, 1886, No. 3,913.

*To all whom it may concern:*

Be it known that I, JULIUS VALENTIN BRANDAU, of the city of Lichtenau, in the Province of Hesse-Nassau, and Kingdom of Prussia and German Empire, have invented a certain new and useful Improvement in Remedies for Preventing Abnormal Perspiration of the Human Body, (for which I have obtained a patent in Great Britain, No. 3,913, dated March 19, 1886,) of which the following is a specification, reference being had to the accompanying drawing, and to the letters of reference marked thereon.

This invention relates to an improved compound for preventing abnormal perspiration of the human body, said compound being hereinafter referred to.

The said composition consists, substantially, of a chemical combination of ether and chloric gas, combined with a mixture of muriatic acid, alcohol, and glycerine, and is produced as follows:

All the parts of the ingredients hereinafter mentioned are parts "by weight," and the words "more or less" are supposed to stand after the words "by weight."

In the drawing forming part of this application, A is a flask containing one hundred parts of butyrate of soda and one hundred parts of acetate of soda, ($C_2H_3O_2Na$,) mixed with one hundred and sixty parts of highly-rectified alcohol (alcohol of 90°) and two hundred and eighty parts of sulphuric acid. This mixture is distilled, and the vapors of butyric ether (ethyl butyrate, $C_6H_{12}O_2$) and acetic ether (ethyl acetate, $C_2H_3O_2,C_2H_5$) thus obtained are conducted through the tube $a$ into the glass vessel B, where they meet with a current of chlorine gas, which enters through pipe $c$ from another flask, C, containing four hundred and fifty parts of pyrolusite, (peroxide of manganese,) four hundred and fifty parts of common salt, and one thousand parts of sulphuric acid, for the purpose of generating the said chlorine gas in the usual manner. The distillation of the said ethers should be conducted in such a manner as to cause them to enter the said vessel B in a slowly-moving current, the said vessel being kept constantly filled with the said chlorine gas from the flask C. Care should also be taken that during the commencement of the operation the mixture of chlorine gas and the butyric and acetic ethers are subjected to the direct action of the sunlight, since only under this condition can the gases be caused to enter into a chemical combination, and thus to be transformed into a liquid state. The process being once started, the direct action of the sunlight is not required, as the condensation of the said gases within the vessel B will continue quietly, and the liquid product will drop from the said vessel through the connecting-tube $b$ into the receptacle D. This receptacle is about three-fourths filled with a mixture of three thousand seven hundred and sixty parts of concentrated muriatic acid, one hundred and twenty parts of highly-rectified alcohol, (of 90°,) and one hundred and twenty parts of glycerine.

The process is completed and the operation stopped as soon as the condensation within the vessel B commences to decrease and chlorine gas only to leave the lower tube, $b$.

The contents collected within the said receptacle C are then thoroughly mixed together by shaking the latter, and the resulting mixture is colored light red by adding some litmus. The mixture is then filled into green or brown bottles and tightly closed, and constitutes the novel preparation "Antihidrorrhoidum."

The preparation is applied externally to the human body in the form of local baths, and may be used in its original concentrated form, or, particularly if the bath be applied to the whole body, diluted by adding a suitable quantity of water. It acts favorably upon the sympathetic fibers of the nerves, regulating the tension of the blood-vessels, and it thus regulates the perspiration in a manner well known.

Having thus described my invention, what I claim as new, and desire to secure by Letters Patent, is—

1. The compound for preventing abnormal perspiration of the human body, consisting of chlorinated ether, composed of chlorine gas combined with butyric and acetic ethers, in combination with muriatic acid, alcohol, and glycerine, substantially as and for the purpose specified.

2. The process of producing a compound for preventing abnormal perspiration of the human body, consisting in combining butyric and acetic ethers and chlorine gas to form a liquid chemical product within a receptacle which contains a surplus of the said chlorine gas, and at the commencement of the operation is subjected, as described, to the direct action of the sunlight, and mixing the said liquid thus obtained with a mixture of concentrated muriatic acid, alcohol, and glycerine, substantially as and for the purpose specified.

In testimony whereof I have signed my name to this specification in the presence of two subscribing witnesses.

JULIUS VALENTIN BRANDAU.

Witnesses:
ADOLF SPIETZ,
ROBERT R. SCHMIDT.